(12) United States Patent
Utsunomiya et al.

(10) Patent No.: US 9,891,458 B2
(45) Date of Patent: *Feb. 13, 2018

(54) INPUT-CAPABLE DISPLAY DEVICE

(71) Applicant: Japan Display Inc., Tokyo (JP)

(72) Inventors: Sumio Utsunomiya, Matsumoto (JP);
Takeshi Koshihara, Suwa (JP);
Takeyoshi Ushiki, Shiojiri (JP); Yoichi Fujikawa, Azumino (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,840

(22) Filed: Jun. 9, 2016

(65) Prior Publication Data

US 2016/0291371 A1    Oct. 6, 2016

Related U.S. Application Data

(63) Continuation of application No. 14/723,073, filed on May 27, 2015, now abandoned, which is a
(Continued)

(30) Foreign Application Priority Data

Jan. 30, 2007 (JP) ................ 2007-019138

(51) Int. Cl.
*G06F 3/041* (2006.01)
*G06F 3/044* (2006.01)
(Continued)

(52) U.S. Cl.
CPC ........ *G02F 1/13338* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS 5,574,262 A    11/1996 Petty
5,786,876 A    7/1998 Ota et al.
(Continued)

FOREIGN PATENT DOCUMENTS

EP    0770971    5/1997
EP    1422601    5/2004
(Continued)

OTHER PUBLICATIONS

Korean Office Action dated Jan. 10, 2014 for corresponding Korean Appln. No. 1 0-2008-0006952.
(Continued)

*Primary Examiner* — Seokyun Moon
(74) *Attorney, Agent, or Firm* — K&L Gates LLP

(57) ABSTRACT

An input-cable display device is provided including a first substrate on which a pair of electrodes that drive a liquid crystal layer are provided; a second substrate wherein the liquid crystal layer is formed within an inner surface of the second substrate between the first substrate and the second substrate; a detection electrode and a dielectric film that are laminated on an outer surface of the second substrate; a detector; a light shielding film; and a color filter layer, wherein the pair of electrodes provided on the first substrate comprises a pixel electrode and a common electrode, and the light shielding film and the color filter layer are laminated on the inner surface of the second substrate.

5 Claims, 5 Drawing Sheets

Related U.S. Application Data continuation of application No. 11/957,047, filed on Dec. 14, 2007, now Pat. No. 9,069,401.

(51) Int. Cl.

| | | |
|---|---|---|
| *G02F 1/1333* | (2006.01) | |
| *G02F 1/1335* | (2006.01) | |
| *G02F 1/1343* | (2006.01) | |
| *G02F 1/1337* | (2006.01) | |
| *G02F 1/1362* | (2006.01) | |
| *G02F 1/1368* | (2006.01) | |

(52) U.S. Cl.
CPC .. *G02F 1/133512* (2013.01); *G02F 1/133514* (2013.01); *G02F 1/133528* (2013.01); *G02F 1/133784* (2013.01); *G02F 1/134309* (2013.01); *G02F 1/134363* (2013.01); *G02F 1/136286* (2013.01); *G06F 3/044* (2013.01); *G06F 3/0412* (2013.01); *G02F 2001/134345* (2013.01); *G02F 2001/136218* (2013.01); *G02F 2201/121* (2013.01); *G02F 2201/123* (2013.01)

(56) References Cited

U.S. PATENT DOCUMENTS

| | | |
|---|---|---|
| 6,259,490 B1 | 7/2001 | Colgan et al. |
| 6,259,940 B1 | 7/2001 | Colgan et al. |
| 6,346,932 B1 | 2/2002 | Maeda |
| 6,424,403 B1 | 7/2002 | Leenhouts et al. |
| 7,126,589 B2 | 10/2006 | Sung |
| 7,268,770 B1 | 9/2007 | Takahata et al. |
| 7,557,869 B2 | 7/2009 | Bang et al. |
| 7,633,566 B2 | 12/2009 | Utsunomiya et al. |
| 8,395,595 B2 | 3/2013 | Miyamoto et al. |
| 9,069,401 B2 * | 6/2015 | Utsunomiya ......... G06F 3/0412 |
| 2004/0017362 A1 | 1/2004 | Mulligan et al. |
| 2004/0135773 A1 | 7/2004 | Bang et al. |
| 2004/0141130 A1 | 7/2004 | Kawata et al. |
| 2004/0217945 A1 | 11/2004 | Miyamoto et al. |
| 2005/0231487 A1 | 10/2005 | Ming |
| 2008/0180584 A1 | 7/2008 | Utsunomiya et al. |
| 2009/0122021 A1 | 5/2009 | Liu et al. |

FOREIGN PATENT DOCUMENTS

| | | |
|---|---|---|
| JP | 2003-196023 | 7/2003 |
| JP | 2006-146895 | 6/2006 |
| KR | 10-2000-0017301 | 11/2002 |
| KR | 10-2004-0022243 | 3/2004 |
| KR | 10-1999-0014751 | 8/2005 |
| TW | 522271 | 3/2003 |
| WO | 2006/043660 | 4/2006 |

OTHER PUBLICATIONS

Taiwanese Office Action issued in connection with Taiwanese Patent Application 97103324, dated Dec. 9, 2013. (3 pages).

European Patent Office, Communication pursuant to Article 94(3) EPC, issued in connection with European Patent Application No. 08 001 511.8, dated Jun. 28, 2013. (5 pages).

European Search Report dated May 24, 2012, for corresponding European Appln. No. 08001511.8.

* cited by examiner

INPUT-CAPABLE DISPLAY DEVICE

CROSS REFERENCES TO RELATED APPLICATIONS

The present application is a continuation of U.S. patent application Ser. No. 14/723,073, filed on May 27, 2015, which application is a continuation of U.S. patent application Ser. No. 11/957,047, filed on Dec. 14, 2007, issued as U.S. Pat. No. 9,069,401 on Jun. 30, 2015, which claims priority to Japanese Priority Patent Application JP 2007-019138 filed in the Japan Patent Office on Jan. 30, 2007, the entire content of which is hereby incorporated by reference.

BACKGROUND

1. Technical Field

The present invention relates to an input-capable display device, such as, for example, a touch panel, to which an input function is added.

2. Related Art

In recent years, as a compact information electronic apparatus, such as a personal digital assistants (PDA) or a personal computer spreads, a display device that has added a so-called touch panel function, which is used for input operation by bringing an object, such as a finger or a pen, into contact with a display screen, has been widely used. In such a touch panel, there is an electrostatic capacitance method as a method for detecting a position at which a finger, or the like, contacts, which is, for example, described in Japanese Unexamined Patent Application Publication No. 2006-146895 and Japanese Unexamined Patent Application Publication No. 2003-196023. The electrostatic capacitance method is a method that flows a weak electric current through an electrostatic capacitance formed by touching a display surface with user's finger and thereby detects a position of contact on the basis of the amount of electric current. Here, in the electrostatic capacitance method, a detection electrode formed in a planar manner and a dielectric film laminated on the detection electrode are used. By touching the dielectric film with the finger, an electrostatic capacitance is formed.

In a liquid crystal display device with a touch panel function that uses the above electrostatic capacitance method, there is a problem that, when an electric field generated by a driving signal that is supplied between a pair of electrodes for driving a liquid crystal layer reaches the detection electrode, the accuracy of detection of a position of contact is decreased because this electric field component acts as a noise. Here, in the above liquid crystal display device with a touch panel function, it is attempted to remove a noise generated due to a signal that is generated from a driving signal.

In the above existing liquid crystal display device with a touch panel function, however, the following problem still remains. That is, in the existing liquid crystal display device with a touch panel function, there is a problem that it requires a complex system for generating a signal that removes a noise.

SUMMARY

An advantage of some aspects of the invention is that it provides an input-capable display device, which is capable of suppressing an influence of noise without requiring a complex system.

An aspect of the invention employs the following configuration to solve the problems. That is, an aspect of the invention provides an input-capable display device. The input-capable display device includes a first substrate, a second substrate, a detection electrode, a dielectric film, and a detector. A pair of electrodes that drive a liquid crystal layer are provided on the first substrate. The second substrate is opposed to the first substrate through the liquid crystal layer. The detection electrode and the dielectric film are laminated on an outer surface of the second substrate. The detector detects a position at which an electrostatic capacitance is formed with the detection electrode through the dielectric film. The second substrate includes a shield conductor that is formed on a side adjacent to the liquid crystal layer. An electric potential of the shield conductor is fixed.

According to the above aspect of the invention, by providing the shield conductor in the second substrate on the side adjacent to the liquid crystal layer, an influence of noise that is generated due to a driving signal of the liquid crystal layer is suppressed without excessively thickening the second substrate and without using a complex system, thus improving the accuracy of detection of a position of contact on the display surface. That is, by supplying a driving signal of the liquid crystal layer to the pair of electrodes, an electric field that is generated to be directed toward the second substrate is blocked by the shield conductor. For this reason, it is possible to prevent a coupling between the pair of electrodes and the detection electrode. Here, the pair of electrodes that drive the liquid crystal layer are provided in the first substrate, and a sufficient distance is ensured between the pair of electrodes and the shield conductor. Therefore, the strength of electric field that is generated by the driving signal of the liquid crystal layer and directed toward the shield conductor is small as compared with the case where a vertical electric field mode electrode structure is employed. Thus, the shield conductor effectively blocks the electric field. Accordingly, without providing an additional complex system and without excessively thickening the second substrate, a coupling between the pair of electrodes and the detection electrode is prevented and thereby an influence of noise due to the driving signal is suppressed. In addition, by forming the shield conductor integrally with the second substrate to not excessively thicken the second substrate, it is possible to ensure a sufficient transmittance ratio. Furthermore, because the shield conductor and the detection electrode are sufficiently spaced apart from each other, it is possible to prevent a capacitance component from being formed between the shield conductor and the detection electrode.

In the input-capable display device according to the aspect of the invention, the shield conductor may have translucency. According to the above aspect of the invention, because the shield conductor is formed of a translucent conductive material, it is possible to form a shield conductor in a planar shape, and it is possible to reliably suppress an influence of noise due to a driving signal of the liquid crystal layer.

In the input-capable display device according to the aspect of the invention, the shield conductor may constitute a light shielding film. According to this aspect of the invention, because the shield conductor also serves as a light shielding film, the thickness of the second substrate is reduced.

In the input-capable display device according to the aspect of the invention, the dielectric film may constitute a polarizer. According to this aspect of the invention, because the polarizer is formed by using a dielectric material, the number of components is reduced and the thickness of the input-capable display device is reduced.

Additional features and advantages are described herein, and will be apparent from the following Detailed Description and the figures.

BRIEF DESCRIPTION OF THE FIGURES

The invention will be described with reference to the accompanying drawings, wherein like numbers reference like elements.

DETAILED DESCRIPTION

First Embodiment

Figure 1:
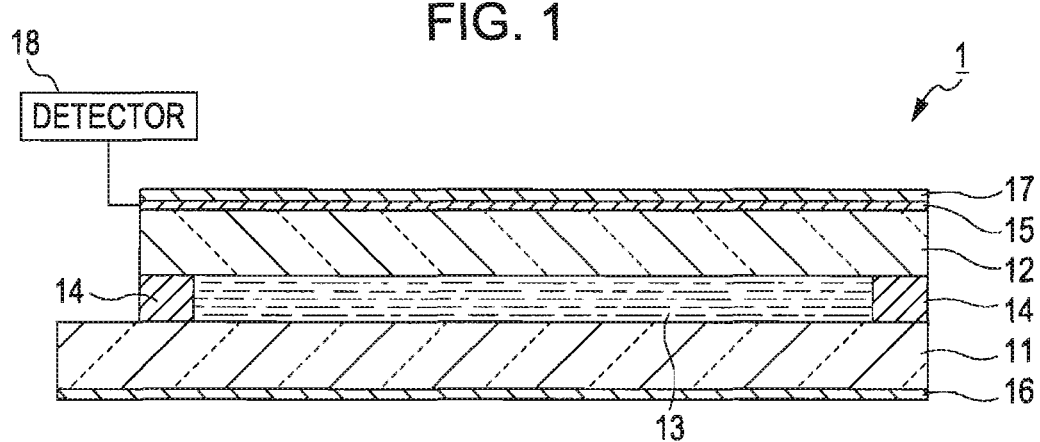
FIG. 1 is a schematic cross-sectional view that shows an input-capable liquid crystal display device according to a first embodiment of the invention.
Figure 2:
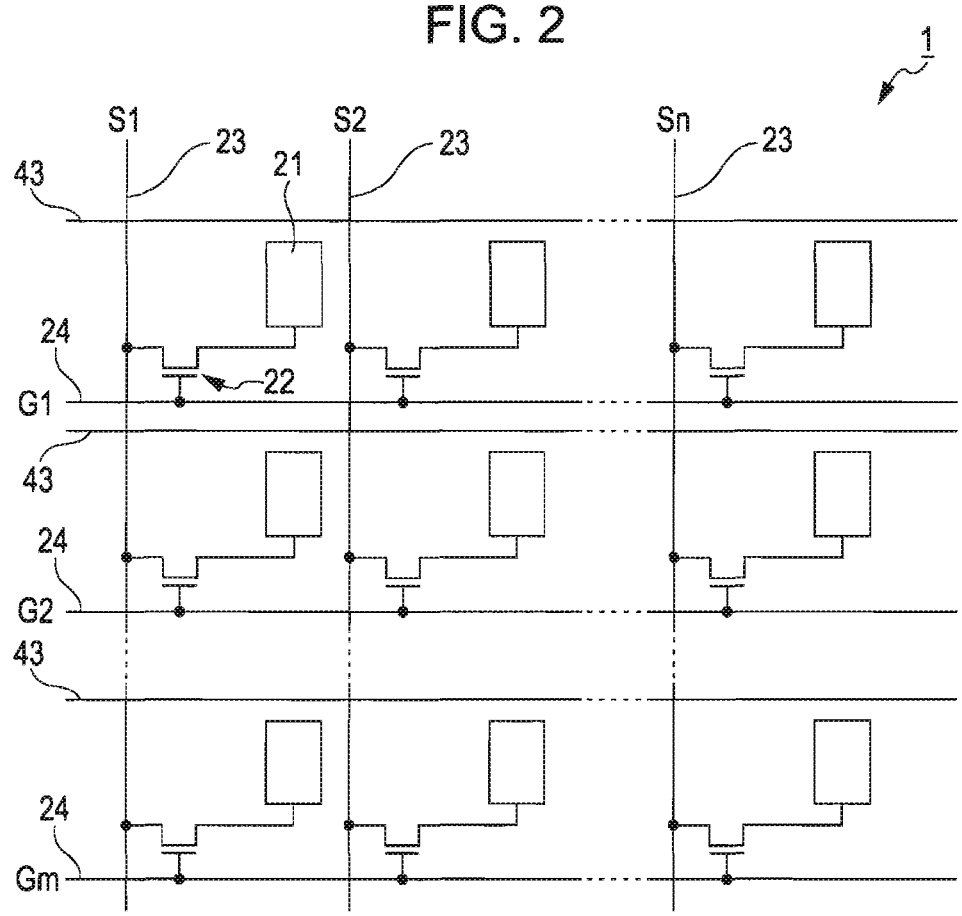
FIG. 2 is an equivalent circuit diagram of FIG. 1.
Figure 3:
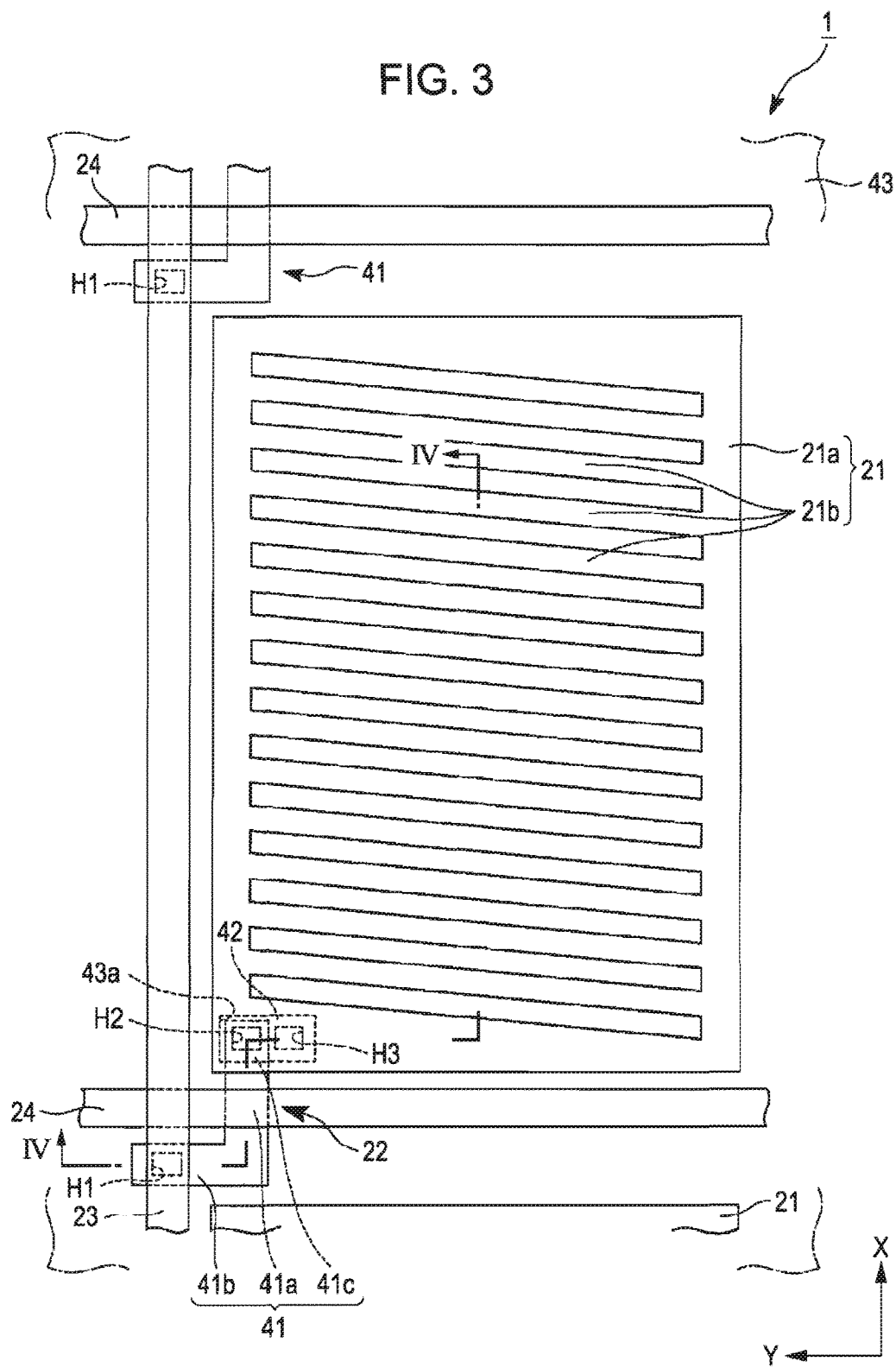
FIG. 3 is a plan configuration diagram that shows a sub-pixel region.
Figure 4:
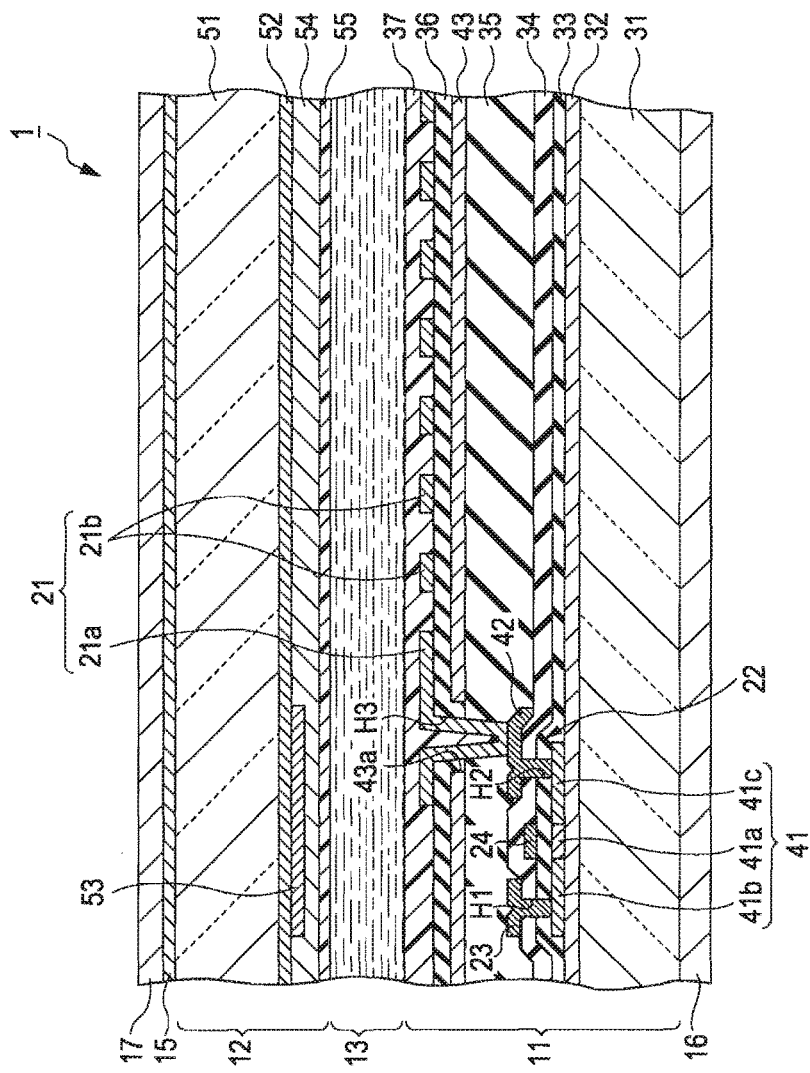
FIG. 4 is a cross-sectional view that is taken along the line IV-IV in FIG. 3.

A first embodiment of an input-capable display device according to the invention will now be described with reference to the accompanying drawings. Note that the scales of the drawings used in the following description are appropriately changed in order to make the components be recognizable. Here, FIG. 1 is a schematic cross-sectional view that shows the input-capable liquid crystal display device. FIG. 2 is an equivalent circuit diagram of FIG. 1. FIG. 3 is a plan configuration diagram that shows a subpixel region. FIG. 4 is a cross-sectional view that is taken along the line IV-IV in FIG. 3.

Input-Capable Display Device

The input-capable liquid crystal display device (input-capable display device) 1 is a transmissive color liquid crystal display device, in which a single pixel is constituted of three sub-pixels that output colored rays of R (red), G (green), B (blue). Here, a display area that becomes a minimum unit for forming display is termed as "sub-pixel region". Here, a display area that becomes a minimum unit for forming display is termed as "sub-pixel region".

First, the schematic configuration of the input-capable liquid crystal display device 1 according to the present embodiment will be described. The input-capable liquid crystal display device 1 according to the present embodiment, as shown in FIG. 1, includes an element substrate (first substrate) 11, which is an active matrix substrate, an opposite substrate (second substrate) 12 that is opposed to the element substrate 11, and a liquid crystal layer 13 that is held between the element substrate 11 and the opposite substrate 12. The input-capable liquid crystal display device 1 is configured to irradiate illuminating light from the outer surface side (the side away from the liquid crystal layer 13) of the element substrate 11. In addition, the input-capable liquid crystal display device 1 includes a seal material 14, which is substantially rectangular and box-shaped in plan view, provided at the outer peripheral portion of an opposed area in which the element substrate 11 is opposed to the opposite substrate 12. By this seal material, the element substrate 11 and the opposite substrate 12 are adhered to each other. Then, an image display area is formed inside the seal material 14 within the input-capable liquid crystal display device 1. Furthermore, the input-capable liquid crystal display device 1 includes a detection electrode 15 that is provided on the outer surface side {the side away from the liquid crystal layer 13) of the opposite substrate 12, a polarizer 16 that is provided on the outer surface side of the element substrate 11, a polarizer (dielectric film) 17 that is provided on the outer surface side of the detection electrode 15, and a detector 18 that detects a position of electrostatic capacitance formed with the detection electrode 15 through the polarizer 17.

A plurality of sub-pixel regions are arranged in the image display area of the input-capable liquid crystal display device 1 in a matrix, as shown in FIG. 2. In each of the plurality of sub-pixel regions, a pixel electrode (first electrode) 21 and a TFT (thin film transistor) element 22 that is used for switching the control of the pixel electrode 21 are formed. In addition, in the image display area, a plurality of data lines 23 and a plurality of scanning lines 24 are arranged in a grid. The sources of the TFT elements 22 are connected to the corresponding data lines 23, the gates thereof are connected to the corresponding scanning lines 24, and the drains thereof are connected to the corresponding pixel electrodes 21.

The data lines 23 are configured to supply image signals S1, S2, Sn that are supplied from a driving circuit (not shown), which is provided in the input-capable liquid crystal display device 1, to the corresponding subpixel regions. Here, the data lines 23 may be configured to supply the image signals S1 to Sn sequentially in the order of lines or may be configured to supply the image signals S1 to Sn in units of a plurality of the grouped data lines 23 that are arranged adjacent to each other. The scanning lines 24 are configured to supply scanning signals G1, G2, . . . Gm, which are supplied from a driving circuit (not shown) provided in the input-capable liquid crystal display device 1, to the corresponding sub-pixel regions. Here, the scanning lines 24 supply the scanning signals G1 to Gm in a pulse-like manner in the order of lines at a predetermined timing.

In addition, the input-capable liquid crystal display device 1 is configured so that, as the TFT element 22, which is a switching element, is made into an on state only during a certain period because of the input of the scanning signals G1 to Gm, the image signals S1 to Sn supplied from the data lines 23 are written to the pixel electrodes 21 at a predetermined timing. Then, predetermined levels of image signals S1 to Sn that are written to the liquid crystal through the pixel electrodes 21 are maintained during a certain period between the pixel electrodes 21 and common electrodes (second electrode) 43, which will be described later.

A detailed configuration of the input-capable liquid crystal display device 1 will now be described with reference to FIG. 3 and FIG. 4. Note that the opposite substrate 12 is not shown in FIG. 3. Note that the opposite substrate 12 is not shown in FIG. 3. In addition, in FIG. 3, the long axis direction of the substantially rectangular sub-pixel region in plan view is defined as X axis direction and the short axis direction is defined as Y axis direction. The element substrate 11, as shown in FIG. 4, includes a substrate body 31, a base protection film 32, a gate insulating film 33, a first interlayer insulating film 34, a second interlayer insulating film 35, a third interlayer insulating film 36 and an alignment layer 37. The substrate body 31 is formed of a translucent material, such as glass, quartz or plastic, for example. The base protection film 32, the gate insulating film 33 1 the first interlayer insulating film 34, the second interlayer insulating film 35, the third interlayer insulating film 36 and the alignment layer 37 are sequentially laminated on the inner surface of the substrate body 31 (the side adjacent to the liquid crystal layer 13). In addition, the element substrate 11 includes a semiconductor layer 41, a scanning line 24, a data line 23, a connection electrode 42, a common electrode 43, and a pixel electrode 21. The semiconductor layer 41 is arranged on the inner surface of the base protection film 32. The scanning line 24 is arranged on the inner surface of the gate insulating film 33. The data line 23 and the connection electrode 42 are arranged on the inner surface of the first interlayer insulating film 34. The common electrode 43 is arranged on the inner surface of the second interlayer insulating film 35. The pixel electrode 21 is arranged on the inner surface of the third interlayer insulating film 36.

The base protection film 32 is, for example, formed of a translucent silicon oxide, such as SiO2 (oxide silicon), for example, and covers the substrate body 31. Note that the material of the base protection film 32 is not limited to SiO2, but it may be formed of an insulating material, such as SiN (silicon nitride), SiON (silicon oxynitride), or ceramics thin film. The gate insulating film 33 is, for example, formed of a translucent material, such as SiO2, for example, and is provided to cover the semiconductor layer 41 that is formed on the base protection film 32. The first interlayer insulating film 34 is, for example, formed of a translucent material, such as SiO2, and is provided to cover the gate insulating film 33 and the scanning line 24 that are formed on the gate insulating film 33. The second interlayer insulating film 35 is, for example, formed of a translucent material, such as acrylic, and is provided to cover the first interlayer insulating film 34 and also cover the data line 23 and the connection electrode 42 that are formed on the first interlayer insulating film 34. The third interlayer insulating film 36 is, for example, formed of a translucent material, such as SiN, and is provided to cover the common electrode 43 that is formed on the inner surface of the second interlayer insulating film 35. The alignment layer 37 is, for example, formed of a resin material, such as polyimide, and is provided to cover the pixel electrode 21 that is formed on the third interlayer insulating film 36. In addition, an alignment process is treated on the surface of the alignment layer 37 so that the short axis direction (Y axis direction) of the sub-pixel region shown in FIG. 3 is made as an alignment direction.

As shown in FIG. 3 and FIG. 4, the semiconductor layer 41 has a substantially L-shape in plan view and is formed to include portion of an area that overlaps the scanning line 24 in plan view through the gate insulating film 33. Then, a channel region 41a is provided on an area of the semiconductor layer 41, which overlaps the scanning line 24 in plan view through the gate insulating film 33. In addition, the semiconductor layer 41 includes a source region 41b and a drain region 41c that are formed by injecting impurity ion therein. Thus, the TFT element 22 is formed using the semiconductor layer 41 as a main body. Note that the channel region 41a is formed by not injecting impurity ion into polysilicon. Here, the semiconductor layer 41 may be formed as a LDD structure in which a high concentration region that has a relatively high impurity concentration in the source region and the drain region and a low concentration (LDD (Lightly Doped Drain)) region that has a relatively low impurity concentration are formed.

The scanning line 24 is arranged along the short axis direction (Y axis direction) of the substantially rectangular sub-pixel region in plan view. The scanning line 24 is, for example, formed of a metal material, such as Al (aluminum).

In addition, portion of the scanning line 24, which is opposed to the channel region 41a through the gate insulating film 33, functions as the gate electrode. The data line 23 is arranged along the long axis direction (X axis direction) of the sub-pixel region in plan view. The data line 23 is, for example, formed of a metal material, such as Al. In addition, the data line 23 is connected to the source region 41b of the semiconductor layer 41 through a contact hole Hl that extends through the gate insulating film 33 and the first interlayer insulating film 34. That is, the data line 23 connects the TFT elements 22 that are arranged along the X axis direction. The connection electrode 42 is connected to the drain region 41c of the semiconductor layer 41 through a contact hole H2 that extends through the gate insulating film 33 and the first interlayer insulating film 34.

The common electrode 43 is formed to cover the second interlayer insulating film 35. The common electrode 43 is, for example, formed of a translucent conductive material, such as ITO (indium tin oxide). Then, an opening 43a is formed at a portion of the common electrode 43, which is located in proximity to a contact hole H3, which will be described later, that is used to conduct the pixel electrode 21 with the connection electrode 42 in order to ensure electrical insulation against the pixel electrode 21. In addition, the common electrode 43 is, for example, applied with a signal that switches periodically between a predetermined certain voltage and 0 V, or applied with a signal that switches periodically (every frame period or every field period) between a first predetermined certain potential and a second predetermined certain potential that is different from the first predetermined certain potential, which are used for driving the liquid crystal layer 13.

As shown in FIG. 3 and FIG. 4, the pixel electrode 21 has a substantially ladder shape in plan view and is, for example, formed of a translucent conductive material, such as ITO, as well as the common electrode 43. Then, the pixel electrode 21 includes a rectangular frame-shaped frame portion 21a in plan view and a plurality of stripe portions 21b that extend in the substantially short axis direction (Y axis direction) of the sub-pixel region and are arranged at intervals in the long axis direction (X axis direction) of the sub-pixel region.

The frame portion 21a is formed so that two pairs of stripe electrodes are connected so as to form a substantially rectangular frame shape in plan view. Two pairs of opposite sides respectively extend along the long axis direction (X axis direction) and along the short axis direction (Y axis direction). In addition, the frame portion 21a is connected to the connection electrode 42 through the contact hole H3 that extends through the second interlayer insulating film 35 and the third interlayer insulating film 36. In this way, the pixel electrode 21 is connected to the drain of the TFT element 22. The stripe portions 21b are formed so as to be parallel to each other. Both ends of each stripe portion 21b are connected to the frame portion 21a at portions which extend along the Y axis direction. In addition, the stripe portions 21b are provided so that the extending directions of the stripe portions 21b are not parallel to the Y axis direction. That is, the extending direction of each of the stripe portions 21b is formed so that each strip portion 21b approaches the scanning line 24 as it extends from one end adjacent to the data line 23 to the other end away from the data line 23 in plan view. As described above, the input-capable liquid crystal display device 1 is configured so that a voltage is applied between the stripe portions 21b and the common electrode 43 and then the liquid crystal is driven by an electric field (lateral electric field) that is generated in a direction in which the plane of the substrate extends. In this way, the pixel electrode 21 and the common electrode 43 constitute a FFS (Fringe-Field Switching) mode electrode structure.

On the other hand, as shown in FIG. 4, the opposite substrate 12 includes a substrate body 51, a shield electrode (shield conductor) 52, a light shielding film 53, a color filter layer 54 and an alignment layer 55. The substrate body 51 is, for example, formed of a translucent material, such as glass, quartz or plastic. The shield electrode 52, the light shielding film 53, the color filter layer 54 and the alignment layer 55 are sequentially laminated on the inner surface of the substrate body 51 (the side adjacent to the liquid crystal layer 13). The shield electrode 52 is formed entirely on the inner surface of the opposite substrate 12. The shield electrode 52 is, for example, formed of a translucent conductive rrlaterial, such as ITO. Then, the shield electrode 52 overlaps the pixel electrode 21 and the common electrode 43 through the liquid crystal layer 13. Here, the shield electrode 52 has a sheet resistance of 1 kΩ/sq or below, for example. In addition, the shield electrode 52 is ensured to be conducted with a wiring portion (not shown), which is provided on the element substrate 11 through an inter-substrate conductive material (not shown), which is formed of a conductive material at the end portion of the opposite substrate 12. Then, the shield electrode 52 exhibits a substantially constant potential through this wiring portion.

The light shielding film 53 is formed in a substantially grid in plan view in a region in which, of the surface of the shield electrode 52, the edge portion of the sub-pixel region overlaps the TFT element 22, the data line 23 and the scanning line 24 through the liquid crystal layer 13 in plan view. The light shielding film 53 edges the subpixel region. In addition, the color filter layer 54 is arranged at a position corresponding to each sub-pixel region so as to cover the light shielding film 53. The color filter layer 54 is, for example, formed of acrylic and contains a color material corresponding to the color the sub-pixel region displays. The alignment layer 55 is, for example, formed of a translucent resin material, such as polyimide and is provided so as to cover the color filter layer 54. Then, a rubbing process in the same direction as the alignment direction of the alignment layer 55 is treated on the inner surface of the alignment layer 55.

Because the alignment process in which the short axis direction (Y axis direction) of the sub-pixel region is defined as an alignment direction is performed for the alignment layers 37, 55, liquid crystal molecules that forms the liquid crystal layer 13 are aligned horizontally along the Y axis direction when no voltage is applied between the pixel electrode 21 and the common electrode 43, that is, in an off state. In addition, liquid crystal molecules are aligned along the direction perpendicular to the extending directions of the stripe portions 21b when voltage is applied between the pixel electrode 21 and the common electrode 43, that is, in an on state. Thus, in the liquid crystal layer 13, by using a birefringent characteristic on the basis of a difference in alignment state of liquid crystal molecules between an off state and an on state, a phase difference is given to light that is transmitted through the liquid crystal layer 13.

The detection electrode 15 is formed entirely over the outer surface of the opposite substrate 12. The detection electrode 15 is, for example, formed of a translucent conductive material, such as ITO. In addition, terminal portions (not shown) are provided at respective four corners of the substantially rectangular detection electrode 15 in plan view. The terminal portions are supplied with a detection signal from the detector 18.

The polarizer 16 is, for example, formed so that a film formed by using a dielectric material of polyvinyl alcohol (PVA) as a base. Then, the polarizer 16 is provided so that the polarization axis thereof extends along the long axis direction (the X axis direction shown in FIG. 2) of the sub-pixel region. The polarizer 17 as well as the polarizer 16 is formed so that a film of polyvinyl alcohol (PVA) is used as a base. Note that a protection film (not shown) that protects the polarizer 17 may be provided on the outer surface side of the polarizer 17. Then, the polarizer 17 is provided so that the polarization axis thereof extends along the short axis direction (the Y axis direction shown in FIG. 2) of the sub-pixel region. Thus, the polarizers 16, 17 are provided so that their polarization axes are substantially perpendicular to each other. Here, a quarter wavelength plate may be arranged on the inner side of the polarizer 17. By arranging the quarter wavelength plate, it is possible to prevent ambient light that enters from the outer surface of the polarizer 17 from being reflected on the element substrate 11 to exit outside. Note that, in coordination with the quarter wavelength plate, the polarization axis of the polarizer 17 is changed appropriately. In addition, an optical compensation film (not shown) may be arranged on one of or both of the inner side of the polarizers 16, 17. By arranging the optical compensation film, it is possible to compensate for a phase difference of the liquid crystal layer 13 when the input-capable liquid crystal display device 1 is viewed obliquely. Also, it is possible to increase the contrast by reducing a leakage of light. The optical compensation film employs a medium that combines a negative uniaxial medium and a positive uniaxial medium or a biaxial medium having refractive indices of nx>nz>ny for respective directions.

The detector 18 is configured to generate a uniform electric field within the plane of the detection electrode 15 by applying the terminal portions provided on the detection electrode 15 with alternating voltages having the same phase and same potentials. In addition, the detector 18 is configured to detect a position of contact of a finger, or the like, through a measured value of the magnitude of electric current that flows through an electrostatic capacitance formed with the detection electrode 15 through the polarizer 17.

Operation of Input-capable Liquid Crystal Display Device

The operation of the above configured input-capable liquid crystal display device 1 will now be described. Light entering from the outer surface side of the element substrate 11 is converted by the polarizer 16 to a linearly polarized light that is parallel to the long axis direction (X axis direction shown in FIG. 3) of the sub-pixel region and then enters the liquid crystal layer 13. Here, when it is in an off state, the linearly polarized light that has entered the liquid crystal layer 13, owing to the liquid crystal layer 13, exits from the liquid crystal layer 13 in the same polarized state as it was when entered the liquid crystal layer 13. Then, this linearly polarized light, because its polarized direction is perpendicular to the polarization axis of the polarizer 17, is blocked by the polarizer 17 and/hence, the sub-pixel region appears to be a dark display. On the other hand, when it is in an on state, the linear light that has entered the liquid crystal layer 13 is given a predetermined phase difference (½ wavelength) by the liquid crystal layer 13 and is converted to a linearly polarized light that has a polarized direction perpendicular to the polarized direction when it entered the liquid crystal layer 13 and then exits from the liquid crystal layer 13. Then, this linearly polarized light, because its polarized direction is parallel to the polarization axis of the polarizer 17, is transmitted through the polarizer 17 to be viewed as a display light and, hence, the sub-pixel region appears to be a bright display.

At this time, when image signals S1 to Sn are supplied from the data lines 23 to the liquid crystal layer 13, electric fields are generated between the pixel electrodes 21 and the corrunon electrodes 43 that are formed on the element substrate 11. Here, a sufficient gap is formed between the pixel electrodes 21 and common electrodes 43 and the shield electrode 52 that is provided in the opposite substrate 12. Therefore/ the strength of electric fields that become noise, traveling from the pixel electrodes 21 and common electrodes 43 toward the shield electrode 52 due to the supply of the image signals S1 to Sn becomes small as compared with a so-called vertical electric field mode electrode structure, such as a TN mode, for example, in which the common electrode is provided in the opposite substrate. Thus, the electric fields that travel from the pixel electrodes 21 and common electrodes 43 toward the detection electrode 15 are effectively blocked by the shield electrode 52.

Then, when user's finger touches the polarizer 17 in a state where a uniform alternating voltage is applied within a plane of the detection electrode 15, an electrostatic capacitance is formed between the detection electrode 15 and the finger through the polarizer 17. Thus, electric current flows from the terminal portions provided on the detection electrode 15 through the electrostatic capacitance. The detector 18 detects the magnitude of electric current that flows by the formation of electrostatic capacitance through, for example, the four corners of the detection region, respectively, and then detects a position of contact of the finger, or the like, from those pieces of information. Here, because the substrate body 51, and the like, is provided between the detection electrode 15 and the shield electrode 52 and a sufficient gap is formed therebetween, a capacitance component is prevented to be formed between the detection electrode 15 and the shield electrode 52.

Electronic Apparatus

Figure 5:
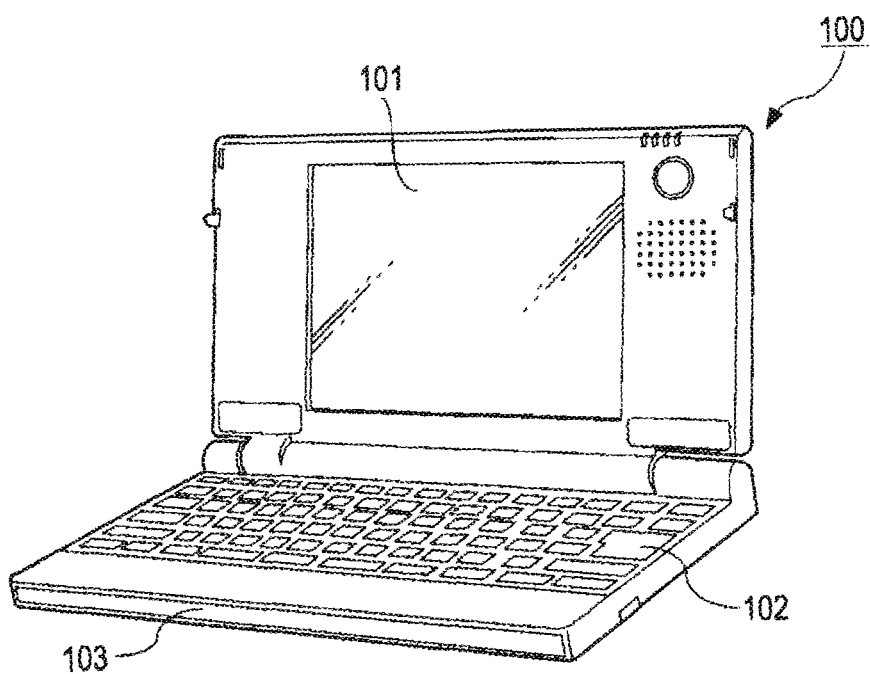
FIG. 5 is a perspective view that shows a mobile personal computer.

The above configured input-capable liquid crystal display device 1 is used as a display portion 101 of a mobile personal computer 100, as shown in FIG. 5, for example. This mobile personal computer 100 includes the display portion 101 and a main body portion 103 that has a keyboard 102.

As described above, according to the input-capable liquid crystal display device 1 in the present embodiment, by providing the opposite substrate 12 with the shield electrode 52, an influence of noise generated while driving the liquid crystal layer 13 is suppressed without excessively thickening the opposite substrate 12 and without using a complex system, thus improving the accuracy of detection of a position of contact on the display surface. Furthermore, a sufficient distance is ensured between the pixel electrodes 21 and common electrodes 43 and the shield electrode 52, so that an influence of noise generated while driving the liquid crystal layer 13 is small as compared with the case where a vertical electric field mode electrode structure is employed. Thus, the shield electrode 52 effectively blocks the noise. Then, because the shield electrode 52 and the detection electrode 15 are sufficiently spaced apart from each other, no capacitance component is formed between the shield electrode 52 and the detection electrode 15. Moreover, the shield electrode 52 is formed of a translucent conductive material, such as ITO, and the shield electrode 52 may be formed in a planar shape, so that it is possible to reliably block a noise. In addition, because the polarizer 17 is formed by using a dielectric material, the number of components is reduced.

Second Embodiment

Figure 6:
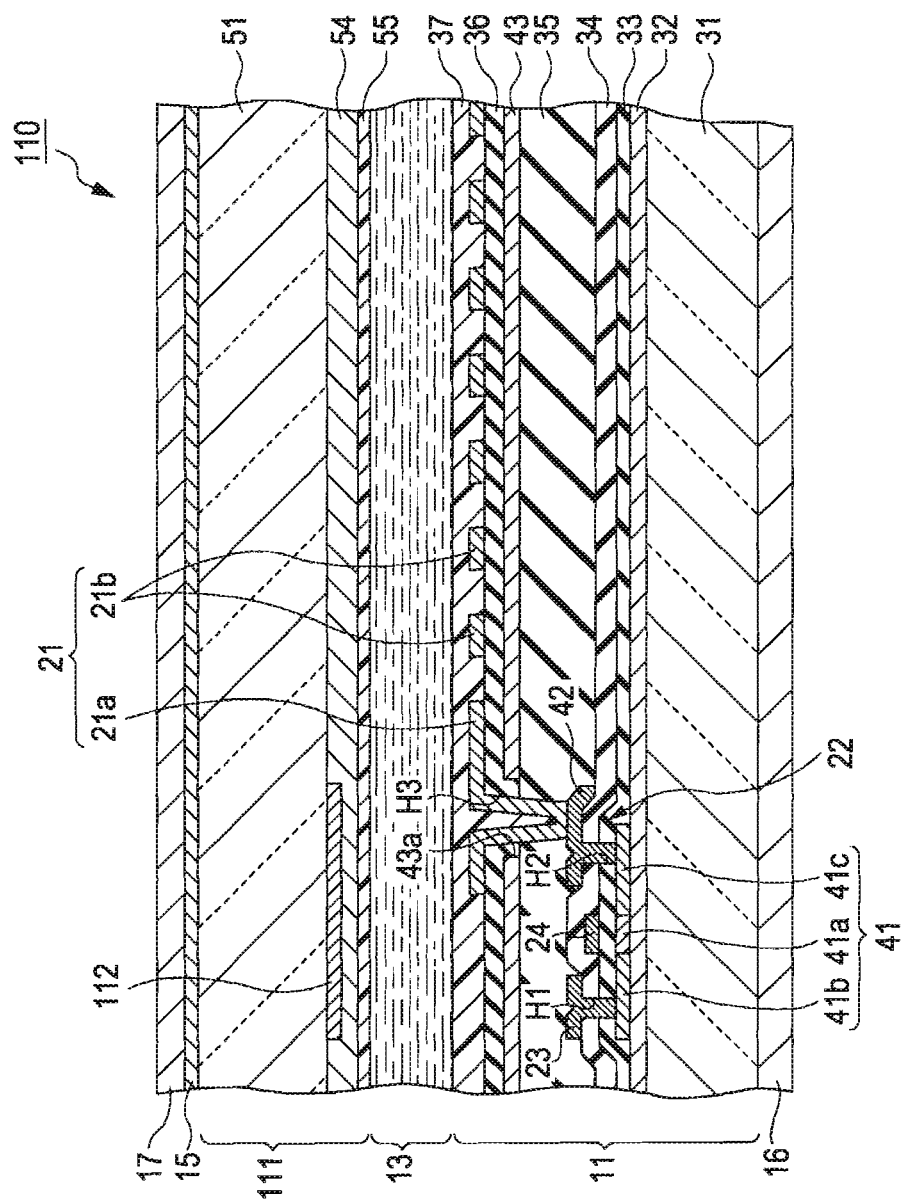
FIG. 6 is a cross-sectional view that shows an input-capable liquid crystal display device according to a second embodiment of the invention.

A second embodiment of an input-capable liquid crystal display device according to the invention will now be described with reference to the drawings. Here, FIG. 6 is a cross-sectional view that shows a sub pixel region. Note that, in the present embodiment, because the configuration of the sub-pixel region differs from that of the first embodiment, this point will be specifically described. The same reference numerals are assigned to the components described in the above embodiment, and a description thereof is omitted.

In the input-capable liquid crystal display device 110, as shown in FIG. 6, a light shielding film (shield conductor) 112 that is provided in an opposite substrate 111 is formed of a conductive material and also serves as a shielding conductor. That is, the opposite substrate 111 includes the substrate body 51, the shield electrode 112, the color filter layer 54 and the alignment layer 55. The light shielding film 112, the color filter layer 54 and the alignment layer 55 are sequentially laminated on the inner surface of the substrate body 51. The light shielding film 112 is, for example, formed of a metal material, such as Cr (chrome), having a light absorption characteristic or a conductive material, having a light absorption characteristic, that is formed by dispersing carbon black in a resin. Then, the light shielding film 112 is connected to the wiring portion provided the element substrate 11 through the above described inter-substrate conductive member at the end portion of the opposite substrate 12. Thus, an electric potential of the light shielding film 112 is controlled to a certain potential. Note that the light shielding film 112 has an opening portion that is formed in correspondence with the sub-pixel region; however, an electric field that is generated due to signals supplied to the pixel electrodes 21 so as to be directed from the pixel electrodes 21 and common electrodes 43 toward the detection electrode 15 can be blocked sufficiently.

As described above, even with the input-capable liquid crystal display device 110 in the present embodiment, the same function and advantageous effects as those of the above described embodiment are obtained; however, because the light shielding film 112 also serves as a shield conductor, the number of components is reduced and thickness of the opposite substrate 111 is reduced.

Note that the invention is not limited to the embodiments described above, but it may be modified into various forms without departing from the spirit of the invention. For example, the potential of the shield electrode is fixed by conducting the shield electrode to the element substrate through the inter-substrate conductive member provided at the end portion of the opposite substrate; however, another method may be employed as long as the potential of the shield electrode is fixed. In addition, the polarizer provided on the outer surface side of the opposite substrate constitutes a dielectric film; however, a dielectric film may be separately provided in addition to the polarizer.

In addition, the input-capable liquid crystal display device is configured so that the pixel electrodes and the common electrodes have the FFS mode electrode structure; however, it may employ another electrode structure that uses a so-called horizontal electric field mode, such as IPS (In-Plane Switching) mode. Then, the input-capable liquid crystal display device is a transmissive liquid crystal device; however, it may be a configuration of another liquid crystal display device, such as a reflective liquid crystal display device or a transflective liquid crystal display device. Furthermore, it is not limited to a color liquid crystal display device.

Moreover, the electronic apparatus that is provided with the input-capable liquid crystal display device is not limited to the mobile personal computer, but it may be another electronic apparatus, such as a cellular phone, a PDA (Personal Digital Assistants), a personal computer, a laptop personal computer f a workstation, digital still camera, an on-board monitor, a car navigation system, a heads-up display, digital video camera, a television; a viewfinder type or direct view type video tape recorder a pager, a personal organizer, an electronic calculator, an electronic book; a projector, a word processor, a video telephone, a POS terminal, and devices provided with a touch panel display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
    a first substrate including a pair of electrodes provided thereon, the pair of electrodes comprising a pixel electrode and a common electrode;
    a second substrate opposed to the first substrate;
    a liquid crystal layer provided between the first substrate and the second substrate;
    a polarizer provided on an outer portion side of the second substrate, the outer portion side being opposite to a liquid crystal layer side of the second substrate;
    a shield conductor provided between the polarizer and the liquid crystal layer;
    a light shielding film; and
    a color filter layer,
    wherein an electric potential of the shield conductor is fixed, and
    wherein the shield conductor, the light shielding film and the color filter layer are laminated on the liquid crystal layer side of the second substrate in order of the shield conductor, the light shielding film, and the color filter layer from the side of the second substrate toward the liquid crystal layer.

2. The display device according to claim 1, wherein the shield conductor has translucency.

3. The display device according to claim 1, wherein the pair of electrodes constitute a horizontal electric field mode structure.

4. The display device according to claim 1, wherein the pair of electrodes are arranged on different layers of the first substrate.

5. The display device according to claim 1, wherein the shield electrode has a sheet resistance of 1 k$\Omega$/sq or below.

* * * * *